United States Patent
Nishizawa

[11] Patent Number: 5,839,276
[45] Date of Patent: Nov. 24, 1998

[54] ENGINE CATALYTIC CONVERTER

[75] Inventor: Kimiyoshi Nishizawa, Yokohama, Japan

[73] Assignee: Nissan Motor Co., Ltd., Yokohama, Japan

[21] Appl. No.: 588,373

[22] Filed: Jan. 18, 1996

[30] Foreign Application Priority Data

Feb. 2, 1995 [JP] Japan .................................. 7-015999

[51] Int. Cl.⁶ .................................................... F01N 3/28
[52] U.S. Cl. ................... 60/288; 60/299; 60/300; 422/171; 422/174; 422/180
[58] Field of Search .......................... 60/288, 300, 299; 422/171, 174, 180

[56] References Cited

U.S. PATENT DOCUMENTS

| | | | |
|---|---|---|---|
| 3,180,712 | 4/1965 | Hamblin | 60/288 |
| 3,503,714 | 3/1970 | Lang | 60/288 |
| 3,813,226 | 5/1974 | Heitland | 60/288 |
| 5,264,186 | 11/1993 | Harada | 60/300 |

FOREIGN PATENT DOCUMENTS 4-601108  2/1992  Japan .

Primary Examiner—Douglas Hart
Attorney, Agent, or Firm—Foley & Lardner

[57] ABSTRACT

A catalytic converter has an upstream catalyst-coated core and downstream catalyst-coated core housed in a same casing, the upstream core being provided with a heater. A bypass passage for bypassing the upstream core to the downstream core is formed between the casing and upstream core. By providing these two catalyst-coated cores and the bypass passage in the casing, the catalytic converter is rendered compact. Further, as the flowrate of exhaust gas through the upstream catalyst is reduced by the bypass passage, temperature rise of the upstream catalyst due to the heater is accelerated, and the emission amount of hydrocarbons and carbon oxides during engine warm-up is decreased.

15 Claims, 10 Drawing Sheets

ENGINE CATALYTIC CONVERTER

FIELD OF THE INVENTION

This invention relates to a catalytic converter of an engine exhaust gas having a heater to heat a catalyst coated core during engine warm-up of the engine.

BACKGROUND OF THE INVENTION

In a catalytic converter for purifying exhaust gas of an automobile engine, it is known to provide a heater for heating a catalyst coated core to activate a catalyst during engine warm-up of the engine.

Tokkai Hei 4-60108 published by the Japanese Patent Office in 1992, for example, discloses a catalytic converter system having an upstream catalytic converter provided with a heater and a downstream catalytic converter (not provided with a heater). These converters are disposed in series, and a bypass passage for bypassing the upstream converter to directly lead the exhaust gas from an engine exhaust pipe to the downstream converter is provided. The system further comprises a change-over valve that connects the exhaust pipe to either the bypass passage or the upstream catalytic converter.

In this catalytic converter system, during engine warm-up, when the catalyst has not yet reached activation temperature, the heater heats the catalyst in the upstream converter, and the change-over valve closes the bypass passage to guide exhaust gas to the upstream converter. Once the catalyst reaches the activation temperature, HC and CO in the exhaust gas are oxidized, and the catalyst temperature rises further due to the heat reaction.

When the catalyst reaches the activation temperature, energization of the heater is stopped, and the change-over valve closes the passage to the upstream catalytic converter to guide exhaust gas to the bypass passage. After that, the downstream catalytic converter, which has been warmed up by the exhaust gas passed through the upstream converter, purifies the exhaust gas. This speeds up activation of the catalyst during warm-up, and also prevents overheating of the upstream catalytic converter after warm-up.

However in this system, since all the exhaust gas passes through the upstream catalytic converter when the heater is energized, heat may be removed from the catalyst by a large volume of low temperature exhaust gas. This retards the catalyst reaching its activation temperature. A plurality of catalytic converters and a bypass passage make the system large, which is undesirable.

SUMMARY OF THE INVENTION

It is therefore an object of this invention to advance a temperature rise of a catalyst during warm-up of an engine.

It is a further object of this invention to decrease the size of a catalytic converter system provided with upstream and downstream converters and a passage bypassing the upstream core.

It is still a further object of this invention to make the exhaust gas flowing into the downstream catalytic converter of the above system have uniform temperature.

It is a still further object of this invention to stop moisture condensation around an electrode provided in a catalytic converter as a part of a heater.

In order to achieve the above objects, a catalytic converter according to this invention comprises a casing having an inlet and an outlet for exhaust gas, an upstream catalyst-coated core housed in the casing, a downstream catalyst-coated core housed downstream from the upstream core in the casing, a mechanism for heating the upstream core, and a bypass passage formed between the casing and upstream core so that a part of the exhaust gas flowing into the inlet bypasses the upstream core and flows into the downstream core.

It be preferable that the casing is formed by a cylindrical wall, the upstream core has a flat part on its outer circumference, and the bypass passage be formed between this flat part and the cylindrical wall of the casing.

Alternatively, the upstream core has a cylindrical outer surface, the casing has a wall bulging outward and the bypass passage is formed between this wall and the cylindrical outer surface of the upstream core.

It is also preferable that a space is provided between the upstream core and the downstream core for mixing exhaust gas that has passed through the upstream core and exhaust gas that has passed through the bypass passage.

In this case, the bypass passage preferably comprises two passages disposed at an interval of approximately 180 degrees on the outside of the upstream core. It is further preferable to provide a guide for guiding exhaust gas flowing into the mixing space from the bypass passage, toward the center of the mixing space.

A flowrate of the exhaust gas flowing into the upstream core from the inlet is preferably set to be within the range of 10–80% of a flowrate of the exhaust gas in the inlet.

It is also preferable that the upstream core is formed of a material that emits heat when electrically energized, and the heating mechanism comprises the upstream core, an anode and cathode connected to an outer circumference of the upstream core such that the anode is disposed in a part higher than the bypass passage.

The details as well as other features and advantages of this invention are set forth in the remainder of the specification and are shown in the accompanying drawings.

DESCRIPTION OF THE PREFERRED EMBODIMENTS

Figure 1:
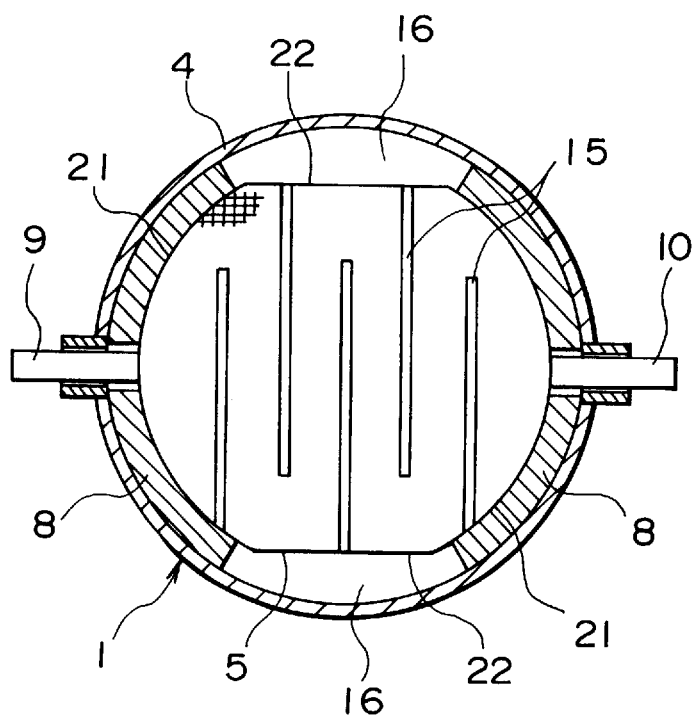
FIG. 1 is a vertical cross-sectional view of a catalytic converter according to this invention.
Figure 2:
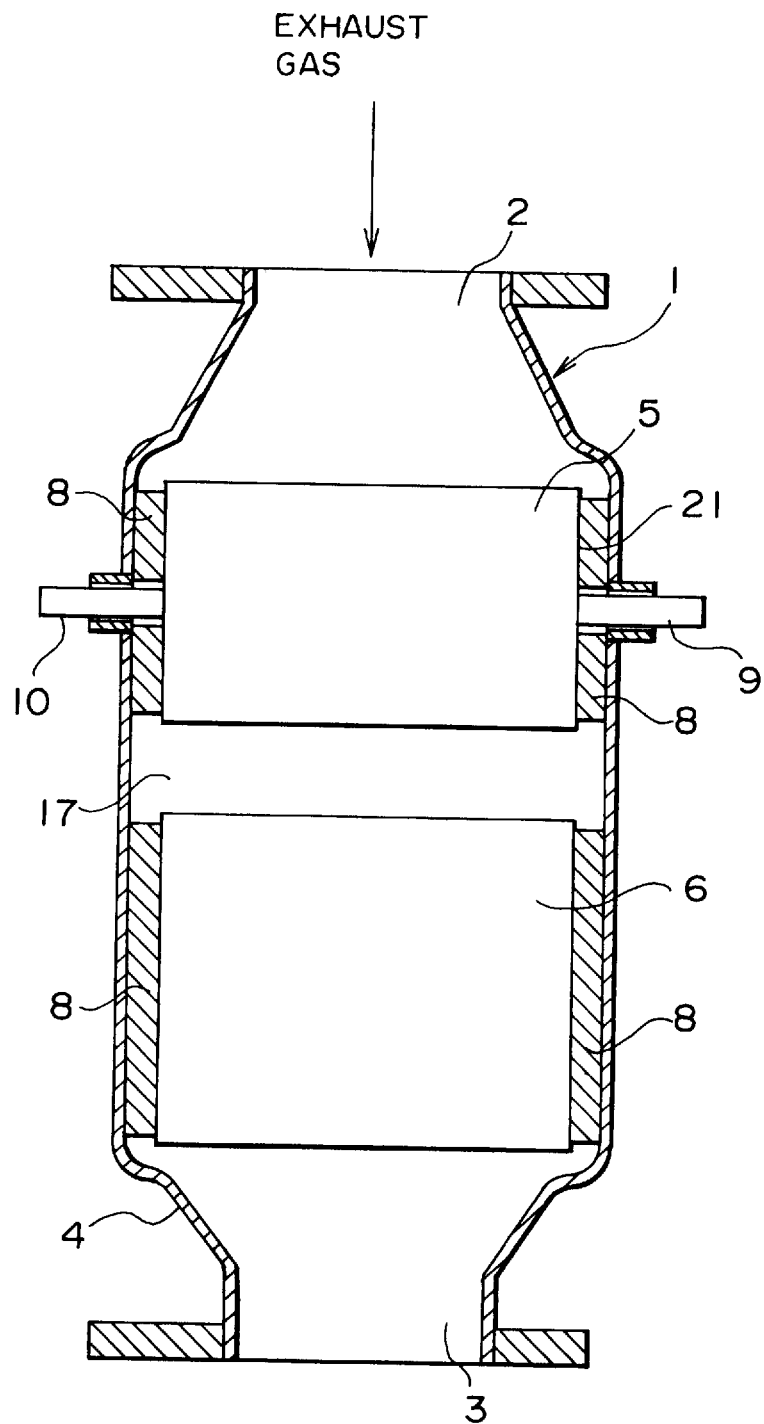
FIG. 2 is a horizontal cross-sectional view of the catalytic converter.
Figure 3:
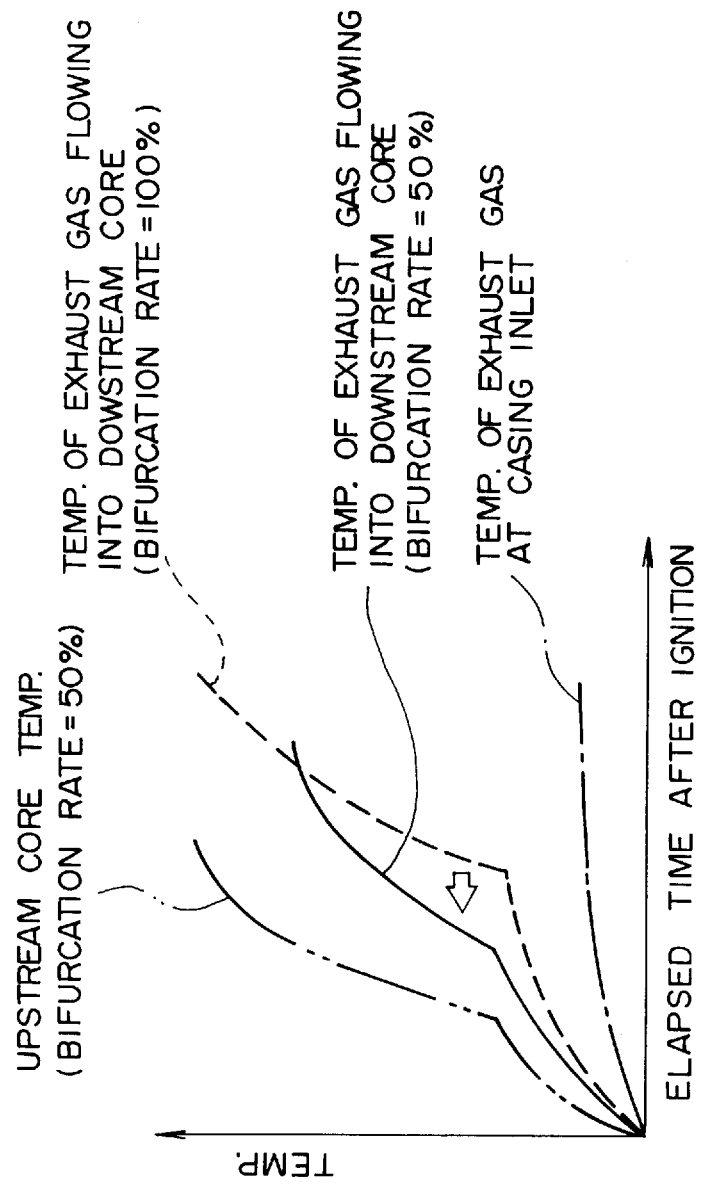
FIG. 3 is a graph showing a relation between a catalyst coated core temperature and engine running time according to this invention.

Referring to FIG. 1 of the drawings, a catalytic converter 1 of an automobile engine comprises a cylindrical casing 4, an insulation member 8 disposed on the inner circumference of the casing 4, and a catalyst-coated core supported on the inner circumference of the insulation member 8. The casing 4 is provided with an inlet 2 and outlet 3 as shown in FIG. 2.

The catalyst-coated core comprises an upstream catalyst-coated core 5 and downstream-coated core 6 disposed in series between the inlet 2 and outlet 3.

These cores are both honeycomb monoliths having a large number of minute passages formed by a corrugated metal foil. The metal foil is coated with a catalytic metal, such as platinum, which purifies exhaust gas passing through the passages by its catalytic action.

The insulation member 8 formed of a ceramic mater provided between the upstream catalyst-coated core 5 and casing 4. The insulation member 8 is also provided between the downstream catalyst-coated core 6 and casing 4. These insulation members 8 have heat and electric insulating effects between the casing 4 and the cores.

An anode 9 and a cathode 10 are connected to the upstream core 5. These electrodes are disposed apart at an angle of approx. 180 degrees on the outer circurference of the upstream catalyst-coated core 5. These electrodes pass through the wall of the casing 4. The anode 9 is connect ed to a positive terminal of a battery via a lead wire and switch circuit, not shown, and the cathode 10 is connected to a battery via a lead wire and chassis of the automobile, not shown.

The upstream catalyst-coated core 5 emits heat when a current is passed through it via the electrodes 9, 10, a plurality of slits 15 being formed in the honeycomb monolith of the core 5 as shown in FIG. 1. The slits 15 pass through the monolith in a longitudinal direction shown in FIG. 2, adjacent slits being formed in mutually opposite directions as shown in FIG. 1. The amount of heat generated by the monolith, when it is energized, depends on the energizing path length of the monolith, which length is determined by the layout of these slits 15.

A mixing space 17 having a predetermined capacity is provided inside the casing 4 between the upstream core 5 and downstream core 6.

The insulation member 8 covering the upstream core 5 is divided into left and right parts by an upper and lower space forming bypass passages 16. The concept of upper and lower in the following description is based on FIG. 1. One end of the bypass passages 16 opens onto the inlet 2, and the other end opens onto the mixing space 17.

The upstream core 5 comprises a pair of left and right curved parts 21 in contact with the insulation members 8, and a pair of upper and lower flat parts 22 adjacent to the bypass passages 16. As the inner circumference of the casing 4 is cylindrically curved, the cross-section of the bypass passage 16 formed by the upper and lower flat parts 22 and casing 4 is effectively crescent-shaped.

If the flowrate of exhaust gas passing through the core 5 is X and the flowrate of exhaust gas passing through the bypass passages 16 is Y, the bifurcation rate to the upstream core 5 is given by the following equation:

$$\text{Bifurcation rate} = \frac{X}{(X+Y)} \times 100\%$$

The cross-sectional surface of the two bypass passages 16 is set such that the aforesaid bifurcation rate is within 10–80%.

The energization of the core 5 is controlled as follows, by a control unit not shown.

When the engine is running, a temperature representing catalyst temperature such as engine cooling water temperature or exhaust gas temperature is detected. Based on this temperature, it is determined whether or not the core 5 has reached a predetermined catalyst activation temperature. When the predetermined catalyst temperature has not been reached, the core 5 is energized for heating.

Hence, when the catalyst has not reached the activation temperature, the core 5 is heated so that the time required for the core 5 to reach the activation temperature is less. When the catalyst reaches the activation temperature, HC and CO in the exhaust gas are oxidized with the aid of the catalyst, and the catalyst temperature rises further due to the heat of reaction.

In this case, when the flowrate of low temperature exhaust gas passing through the core 5 during heating of the core is large, heat may be removed from the catalyst so that the time required to reach the activation temperature is longer.

According to this invention, part of the exhaust gas flowing into the inlet 2 of the casing 4 is diverted away from the core 5 into the bypass passages 16, so that the exhaust gas flowrate through the core 5 is suitably reduced. Consequently, the a mount of heat removed from the core 5 by low temperature exhaust gas is less, and the time required for the catalyst in the core 5 to reach activation temperature is also less.

In the mixing space 17, exhaust gas heated in the core 5 is mixed with exhaust gas that has passed through the bypass passages 16. The gas then flows into the down stream core 6 and heats the core 6.

As the time required for the core 5 to reach the activation temperature is shorter, the temperature of the exhaust gas flowing into the core 6 rises sooner, and activation of the core 6 also occurs earlier.

In this way, by diverting a part of the exhaust gas into the bypass passages 16 so that the flowrate through the core S is reduced, activation of the cores 5 and 6 completes earlier, and as a result, there is a large reduction of HC and CO emissions when the engine is warming up.

Figure 4:
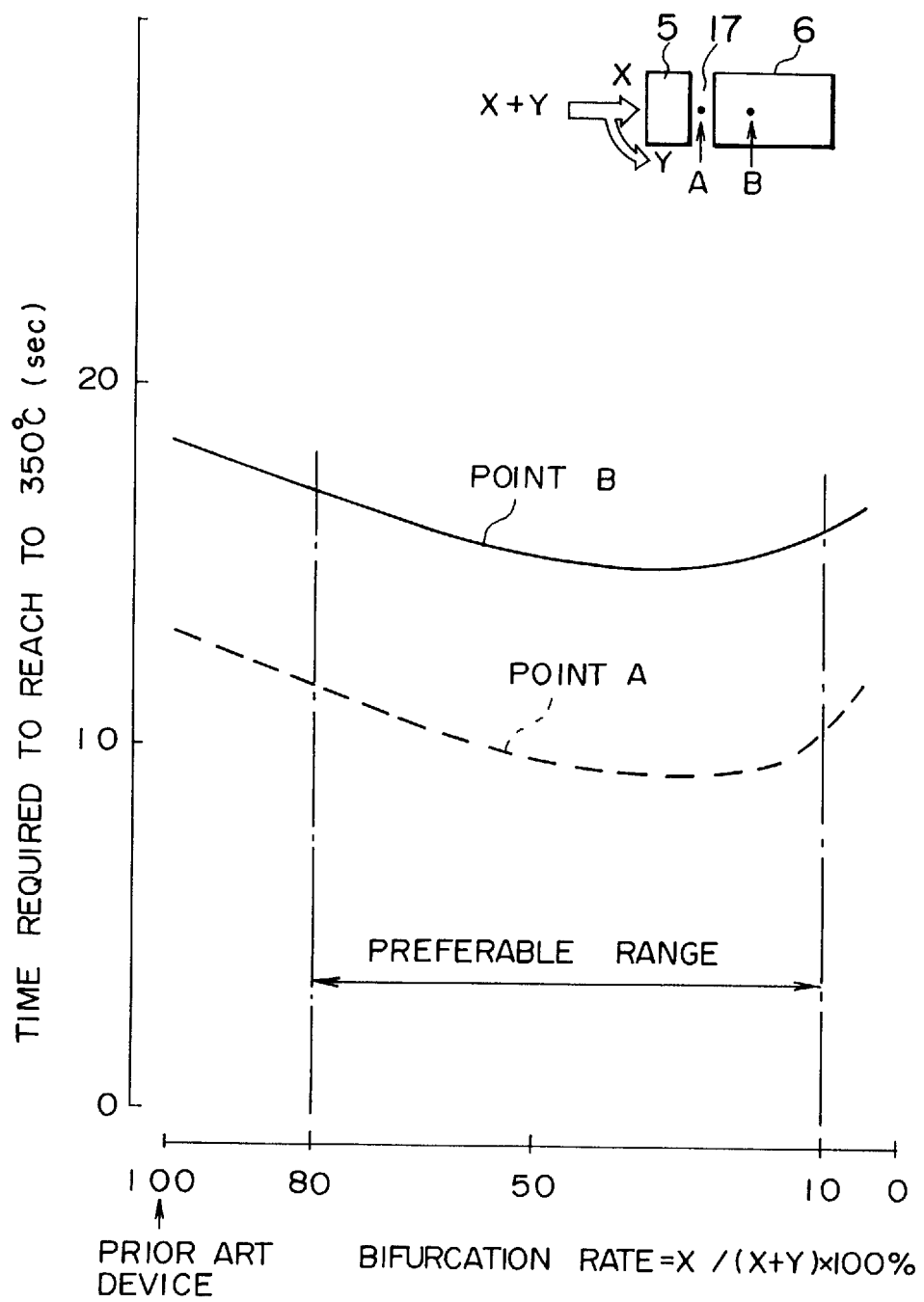
FIG. 4 is a graph showing a relation between a bifurcation rate and temperature rise of exhaust gas according to this invention.

FIG. 4 shows the time required for the temperature in the mixing space 17 and the internal temperature of the core 6 to reach 350° C. when the bifurcation rate to the core 5 is varied from 0 to 100%. From this result, it is seen that a preferred temperature rise is obtained when the bifurcation rate to the core 5 is within the range of 10–80%.

As low temperature exhaust gas that has passed through the two bypass passages 16 flows into the mixing space 17 from the opposite direction, it is mixed well with high temperature gas which that has passed through the core 5. Hence, as the temperature distribution of exhaust gas is rendered uniform before entering the core 6, activation of the core 6 completes even earlier.

In the aforesaid construction where the bypass passages 16 are formed between the casing 4 and core 5, as compared to the prior art structure where the bypass passage comprises an independent pipe, the bypass passages 16 are shorter and volume of the mixing space 17 is smaller. The construction of this invention is also advantageous from the viewpoint of promoting mixing of low temperature exhaust gas that has passed through the bypass passage 16 and high temperature exhaust gas that has passed through the core 5. The fact that the thermal capacity of the members forming the bypass passages 16 and mixing space 17 is smaller also has a preferable effect on the temperature rise of the exhaust gas flowing into the core 6.

By forming the bypass passages 16 at equidistant intervals from the electrodes 9, 10, a heat loss in the vicinity of the electrodes 9, 10 due to low temperature exhaust gas flowing through the passages 16 is small. This also has a preferable effect in speeding up activation of the core 5.

Further, by disposing the bypass passages 16 between the cylindrical casing 4 and flat parts 22 of the core 5, the casing 4 becomes more compact and a space required for the installation of the catalytic converter becomes smaller.

By disposing the electrodes 9, 10 in a horizontal direction as shown in FIG. 1, moisture that has condensed in the bypass passages 16 is prevented from collecting in the vicinity of the electrodes, which moisture would lead to an electrical discharge.

Figure 5:
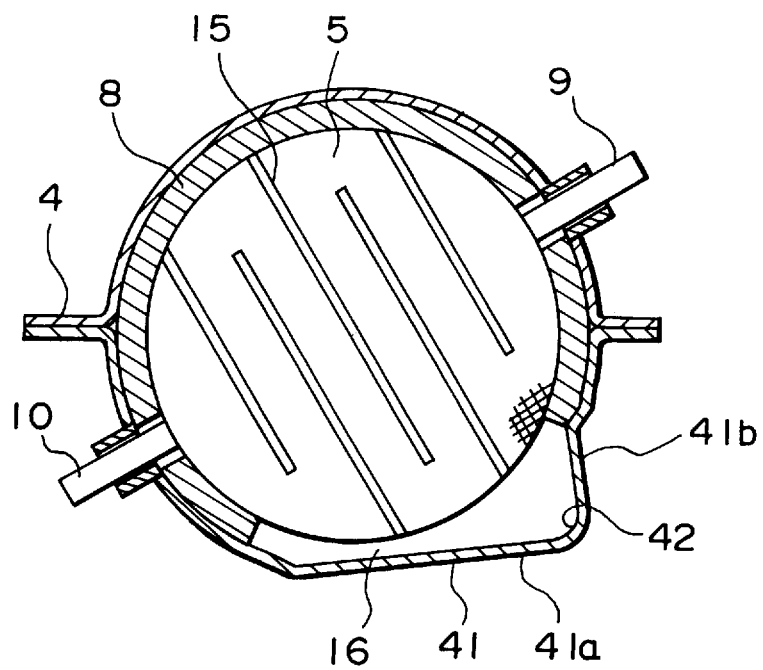
FIG. 5 is a vertical cross-sectional view of a catalytic converter according to a second embodiment of this invention.
Figure 6:
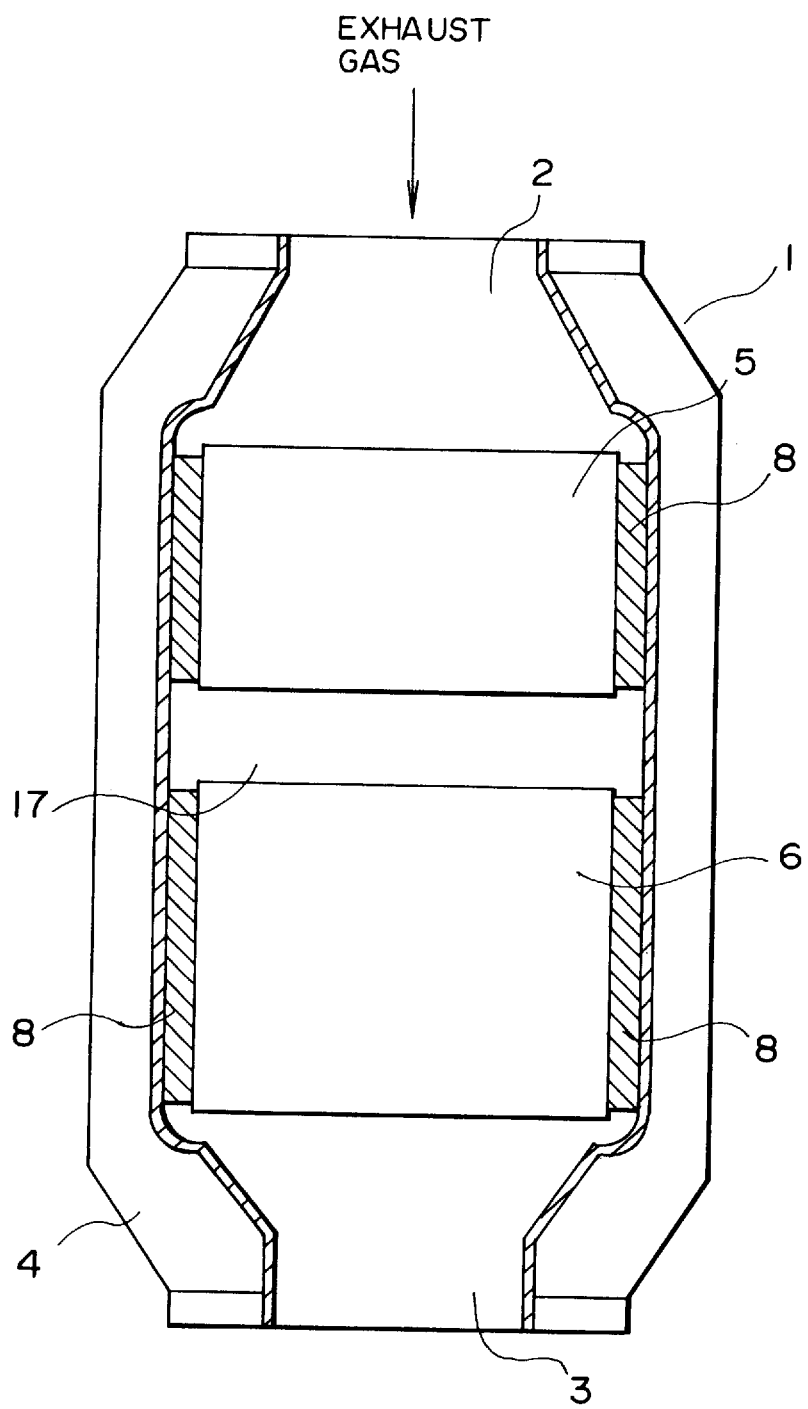
FIG. 6 is a horizontal cross-sectional view of the catalytic converter according to the second embodiment.

FIGS. 5 and 6 show a second embodiment of this invention.

According to this embodiment, the core 5 has a circular cross-section, while the casing 4 has a wall 41 that bulges toward the outside. The bypass passage 16 is formed by the outer surface of the core 5 and this wall 41.

The casing 4 of plate metal splits in half. They are formed by a press and welded together. The insulation member 8 having a C-shaped vertical cross-section is provided around the core 5 as shown in FIG. 5.

The passage wall 41 comprises a horizontal wall part 41a oriented in a horizontal direction and a vertical wall part 41b oriented in a perpendicular direction, the part between 41a and 41b functioning as a dip 42 for collecting moisture that condenses in the casing 4.

The anode 9 is disposed above the bypass passage 16 in a part relatively higher than the center of the core 5, whereas the cathode 10 is disposed at a side of the bypass passage 16 in a part relatively lower than the center of the core 5.

By disposing the anode 9 above the bypass passage 16 and providing the dip 42 for collecting moisture that has condensed in the casing 4, any condensed moisture is prevented from flowing toward the anode 9, and electrical discharge from the anode 9 is prevented.

By forming the bypass passage 16 by the bulged wall 41, there is a wider degree of freedom in setting the cross-sectional area of the passage 16. The shape of the casing 4 can be varied according to the shape of space in which the catalytic converter is installed in the automobile.

Figure 7:
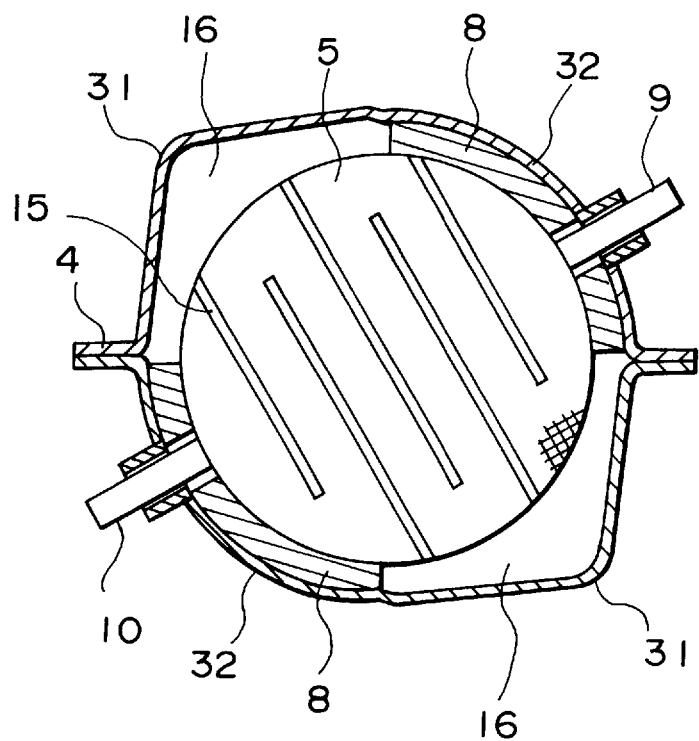
FIG. 7 is a vertical cross-sectional view of a catalytic converter according to a third embodiment of this invention.
Figure 8:
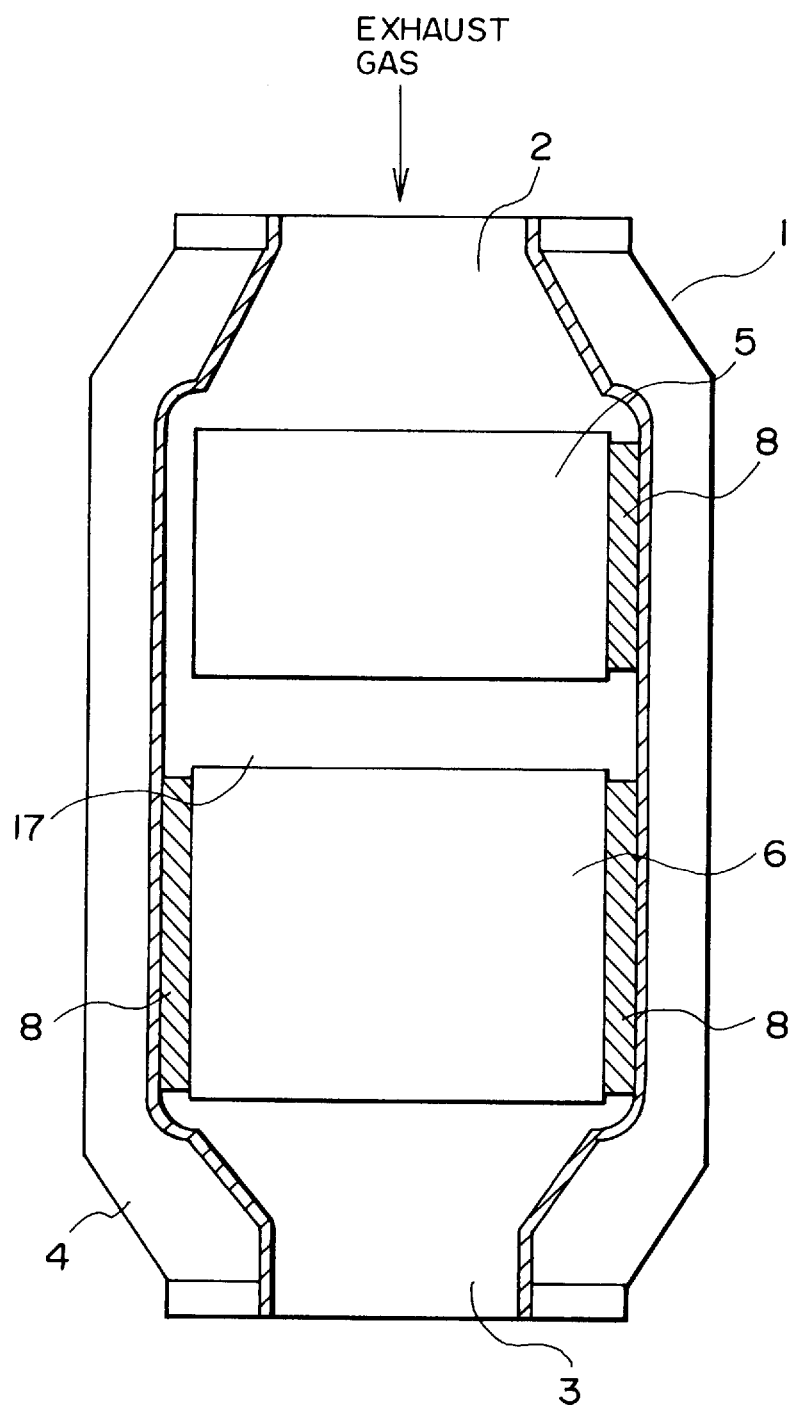
FIG. 8 is a horizontal cross-sectional view of the catalytic converter according to the third embodiment.

FIGS. 7 and 8 show a third embodiment of this invention.

According to this embodiment, two bypass passages 16 are provided. Each passage 16 is formed by a passage wall 31 similar to the wall 41 of the second embodiment and the outer surface of the core 5.

Figure 9:
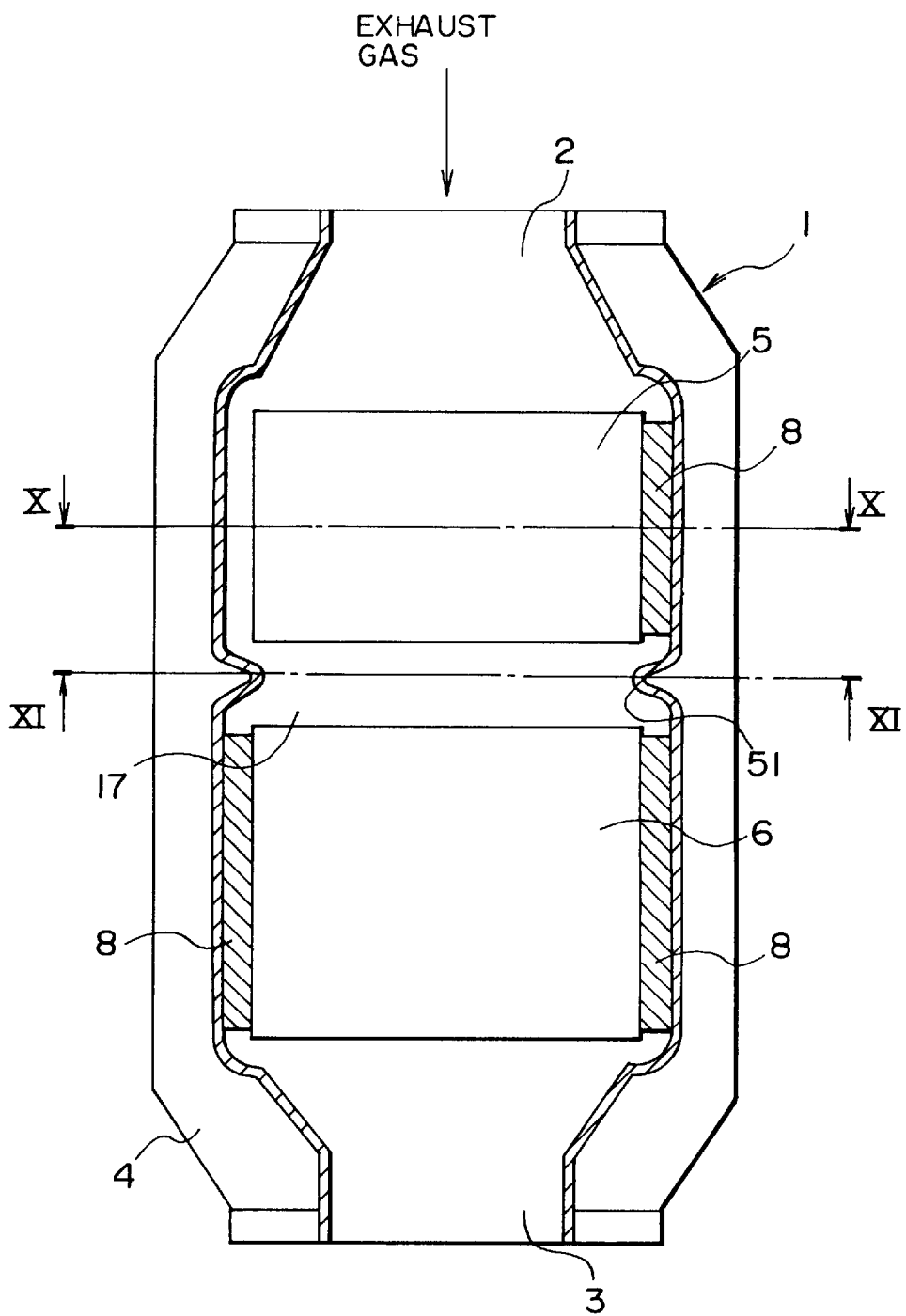
FIG. 9 is a horizontal cross-sectional view of a catalytic converter according to a fourth embodiment of this invention.
Figure 10:
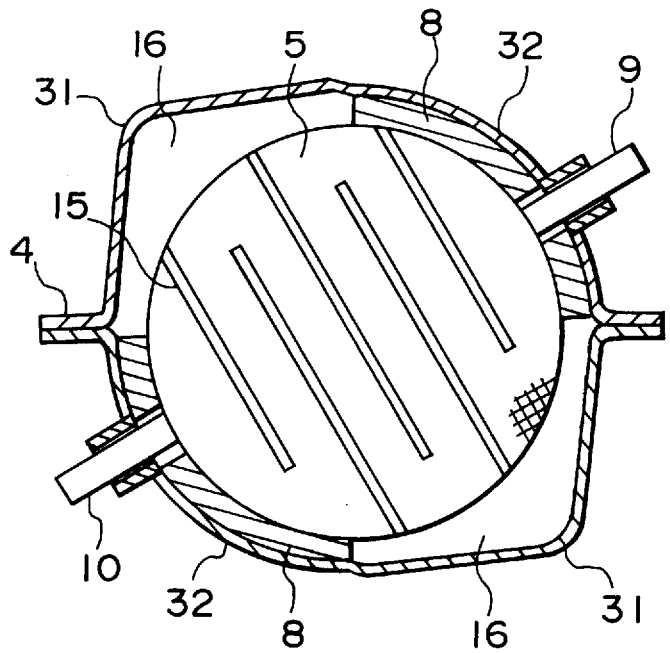
FIG. 10 is a cross-sectional view of the catalytic converter taken along a line X—X of FIG. 9.
Figure 11:
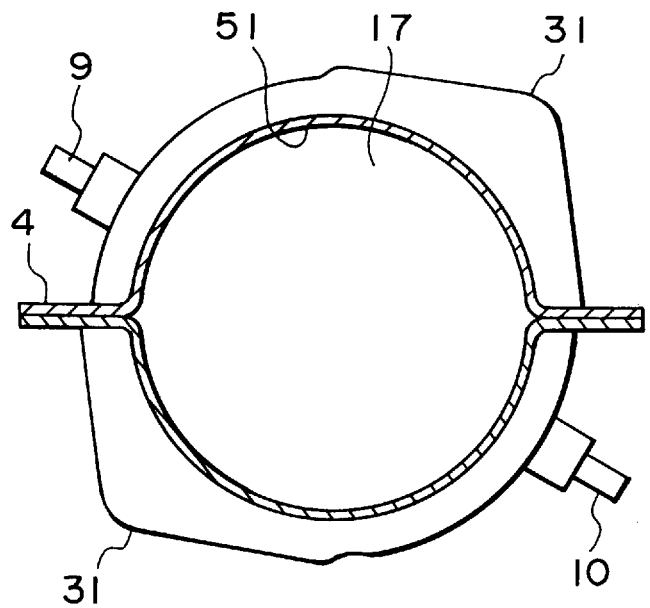
FIG. 11 is a cross-sectional view of the catalytic converter taken along a line XI—XI of FIG. 9.

FIGS. 9–11 show a fourth embodiment of this invention.

According to this embodiment, in addition to the structure of the third embodiment, a guide 51 is formed in the casing 4 so as to guide exhaust gas that has flowed out of the bypass passage 16 in a central direction. The guide 51 is positioned between the cores 5 and 6, and is constructed by making the wall surface of the casing 4 project inward to form a ring shape.

The guide 51 guides low temperature exhaust gas flowing into the mixing space 17 from the bypass passage 16 toward the center part of the space 17, and hence promotes its mixing with high temperature exhaust gas that has passed through the core 5. This helps to make the temperature distribution of exhaust gas flowing into the core 6 uniform.

The embodiments of this invention in which an exclusive property or privilege is claimed are defined as follows:

I claim:

1. A catalytic converter adapted to be interposed in an engine exhaust pipe, comprising:
   a cylindrical wall forming a casing having an inlet and an outlet for exhaust gas;
   an upstream catalyst-coated core housed in the casing, the upstream catalyst having a flat part on its outer circumference;
   a downstream catalyst-coated core housed downstream from the upstream core in the casing;
   a heater for heating the upstream core; and
   a first bypass passage formed between the cylindrical wall of the casing and the flat part of the upstream core so that part of the exhaust gas flowing into the inlet bypasses the upstream core and flows into the downstream core.

2. A catalytic converter as defined in claim 1, wherein the upstream core is spaced from the downstream core to provide a space therebetween for mixing exhaust gas that has passed through the upstream core and exhaust gas that has passed through the first bypass passage.

3. A catalytic converter as defined in claim 2, further comprising a guide for guiding exhaust gas flowing into the mixing space from the first bypass passage toward the center of the mixing space.

4. A catalytic converter as defined in claim 1, further comprising a second bypass passage disposed diametrically opposite the upstream core.

5. A catalytic converter as defined in claim 1, wherein a flowrate of the exhaust gas flowing into the upstream core from the inlet is set to be within the range of 10–80% of a flowrate of the exhaust gas in the inlet.

6. A catalytic converter as defined in claim 1, wherein the upstream core is formed of a material that emits heat when electrically energized, and the heater comprises an anode and a cathode both connected to an outer circumference of the upstream core, and the upstream core.

7. A catalytic converter as defined in claim 6, wherein the anode is disposed at a higher level than the first bypass passage when interposed in the exhaust pipe.

8. A catalytic converter adapted to be interposed in an engine exhaust pipe, comprising:
   a casing having an inlet and an outlet for exhaust gas, and an outwardly bulging wall;
   an upstream catalyst-coated core housed in the casing;
   a downstream catalyst-coated core housed downstream from the upstream core in the casing;
   a heater for heating the upstream core; and
   a first bypass passage formed between the bulging wall of the casing and the upstream core so that part of the exhaust gas flowing into the inlet bypasses the upstream core and flows into the downstream core.

9. A catalytic converter as defined in claim 8, wherein the upstream core has a cylindrical surface.

10. A catalytic converter as defined in claim 8, wherein the upstream core is spaced from the downstream core to provide a space therebetween for mixing exhaust gas that has passed through the upstream core and exhaust gas that has passed through the first bypass passage.

11. A catalytic converter as defined in claim 10, further comprising a guide for guiding exhaust gas flowing into the mixing space from the first bypass passage toward the center of the mixing space.

12. A catalytic converter as defined in claim 8, further comprising a second bypass passage disposed opposite the first bypass passage around the upstream core.

13. A catalytic converter as defined in claim 8, wherein a flowrate of the exhaust gas flowing into the upstream core from the inlet is set to be within the range of 10–80% of a flowrate of the exhaust gas in the inlet.

14. A catalytic converter as defined in claim 8, wherein the upstream core is formed of a material that emits heat when electrically energized, and the heater comprises an anode and a cathode both connected to an outer circumference of the upstream core, and the upstream core.

15. A catalytic converter as defined in claim 14, wherein the anode is disposed at a higher level than the first bypass passage when interposed in the exhaust pipe.

* * * * *